United States Patent
Bruinink et al.

(10) Patent No.: US 6,233,028 B1
(45) Date of Patent: May 15, 2001

(54) PLASMA-ADDRESSED LIQUID CRYSTAL DISPLAY WITH REDUCED COLUMN VOLTAGES

(75) Inventors: Jacob Bruinink; Frans Leenhouts, both of Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 08/956,003

(22) Filed: Oct. 22, 1997

(30) Foreign Application Priority Data

Oct. 25, 1996 (NL) .................................................. 96202974

(51) Int. Cl.⁷ .......................... G02F 1/1333; G02F 1/133; G02F 1/13
(52) U.S. Cl. ................................ 349/32; 349/58; 349/177; 349/180; 345/58; 345/60; 340/794; 252/299.1; 428/1
(58) Field of Search ................................ 349/32, 177, 58, 349/180; 340/794; 252/299.1; 428/1; 345/58, 60

(56) References Cited

U.S. PATENT DOCUMENTS

| | | | |
|---|---|---|---|
| 4,684,477 | * 8/1987 | Sugimori et al. | 252/299.61 |
| 4,818,428 | * 4/1989 | Scheuble et al. | 252/299.1 |
| 4,896,149 | * 1/1990 | Buzak et al. | 340/794 |
| 5,221,979 | * 6/1993 | Kim | 359/54 |
| 5,414,440 | * 5/1995 | Ilcisin et al. | 345/58 |
| 5,461,395 | * 10/1995 | Stein | 345/60 |
| 5,747,121 | * 5/1998 | Okazaki et al. | 428/1 |
| 5,793,455 | * 8/1998 | Nakamura | 349/96 |
| 5,807,499 | * 9/1998 | Tarashima et al. | 252/299.63 |
| 5,853,801 | * 12/1998 | Suga et al. | 427/164 |
| 5,877,831 | * 3/1999 | Leenhouse et al. | 349/113 |
| 6,025,895 | * 2/2000 | Yazaki et al. | 349/86 |

OTHER PUBLICATIONS

"A 16–Inch Full Colour Plasma Addressed Liquid Crystal Display". Digest of Tech. Papers, May, 1993 SID Int. Symp., Society for Information Display, pp. 883–886.

* cited by examiner

*Primary Examiner*—William L. Sikes
*Assistant Examiner*—Julie Ngo

(57) ABSTRACT

A plasma-addressed liquid crystal color display device comprising a layer of liquid crystal material, data electrodes coupled to the liquid crystal layer and adapted to receive data voltages for activating pixels of the liquid crystal layer, and a plurality of ionizable-gas-filled plasma channels extending generally transverse to the data electrodes for selectively switching on said liquid crystal pixels. The plasma channels are sealed off by a thin dielectric sheet. To reduce the magnitude of the data voltages needed to activate the device, the LC layers are given compositions such that a much higher fraction of the applied data voltages appears across the liquid crystal layer thereby allowing a smaller data voltage to be used to obtain the same effect on the liquid crystal pixels.

7 Claims, 8 Drawing Sheets

PLASMA-ADDRESSED LIQUID CRYSTAL DISPLAY WITH REDUCED COLUMN VOLTAGES

BACKGROUND OF THE INVENTION

This invention relates to plasma-addressed liquid crystal display panels commonly referred to as "PALC" display devices. These devices comprise, typically, a sandwich of: a first substrate having deposited on it parallel transparent column electrodes, commonly referred to as "ITO" columns or electrodes since indium-tin oxides are typically used, on which is deposited a colour filter layer; a second substrate comprising parallel sealed plasma channels corresponding to rows of the display crossing all of the ITO columns each of which is filled with a low pressure ionizable gas, such as helium, and containing spaced cathode and anode electrodes along the channel for ionizing the gas to create a plasma, which channels are closed off by a thin transparent dielectric sheet; and a liquid crystal (LC) material located between the substrates. The structure behaves like an active matrix liquid crystal display in which the thin film transistor switches at each pixel are replaced by a plasma channel acting as a row switch and capable of selectively addressing a row of LC pixel elements. In operation, successive lines of data signals representing an image to be displayed are sampled at column positions and the sampled data voltages are respectively applied to the ITO columns. All but one of the row plasma channels are in the de-ionized or non-conducting state. The plasma of the one ionized selected channel is conducting and, in effect, establishes a reference potential on the adjacent side of a row of pixels of the LC layer, causing each LC pixel to charge up to the applied column potential of the data signal. The ionized channel is turned off, isolating the LC pixel charge and storing the data voltage for a frame period. When the next row of data appears on the ITO columns, only the succeeding plasma channel row is ionized to store the data voltages in the succeeding row of LC pixels, and so on. As is well known, the attenuation of each LC pixel to backlight or incident light is a function of the stored voltage across the pixel. A more detailed description is given in Buzak et al., "A 16-Inch Full Colour Plasma Addressed Liquid Crystal Display", Digest of Tech. Papers, 1993 SID Int. Symp., Soc. for Info. Displ. pp. 883–886.

A problem in the known construction is that too large a column voltage is required for full activation of a LC pixel. Typical driving voltages required with the known construction such as described in the SID Digest 93 publication are in the range of 80–100V.

OBJECTS AND SUMMARY OF THE INVENTION

An object of the invention is an improved PALC display device.

Another object of the invention is a PALC display device requiring lower column driving voltages than were heretofore required.

Another object of the invention is a PALC colour display device requiring reduced column voltages for reliable operation.

To this end a PALC display device is provided comprising a layer of liquid crystal material, data electrodes coupled to the liquid crystal layer and adapted to receive data voltages for activating portions of the liquid crystal layer, a plurality of elongated plasma channels extending generally transverse to the data electrodes for selectively switching on said liquid crystal portions, a dielectric sheet closing off the plasma channels on the side facing the data electrodes, said plasma channels each comprising spaced elongated cathode and anode plasma electrodes and an ionizable gas filling, characterized in that the liquid crystal layer is located between the data electrodes and the plasma channels, the dielectric anisotropy ($\Delta\epsilon$) lies between 1 and 9 and the dielectric constant perpendicular to the director ($\epsilon_\perp$) lies between 1.5 and 5 ($1.5 \leq \epsilon_\perp \leq 5$; $1 \leq \Delta\epsilon \leq 9$).

For PALC devices the required column driving voltage shows a low value for the indicated ranges of $\epsilon_\perp$ and $\Delta\epsilon$. Furthermore the required column driving voltage shows less variation. At values for $\epsilon_\perp$ smaller than 1.5 the LC material is liable to crystallize, which reduces the effectiveness of the LC material.

In a preferred embodiment of the invention the dielectric constant perpendicular to the director $\epsilon_\perp$ is smaller than 3.5. The required column voltage difference becomes smaller as $\epsilon_\perp$ is reduced.

Preferably the dielectric anisotropy $\Delta\epsilon$ is less than 5 and more than 2. In this range the required column voltage shows a minimum. Furthermore the required column voltage is almost independent of the dielectric anisotropy and shows only a relatively small dependence on the dielectric constant perpendicular to the director.

In a preferred embodiment of the invention the PALC display device has a LC layer having a twist angle between 80 and 120 degrees. Within this range a compromise is achieved between the dynamic range $\Delta V_{appl}$ on the one hand and the viewing angle on the other hand. An increase of the twist angle reduces the required column driving voltage, however too high an angle reduces the viewing angle. The twist angle is preferably between 85° and 110°, even more preferably between 90 and 100 degrees.

Preferably the liquid crystal material has an elastic ratio $k_3/k_1$ smaller than 1.75. Small values of $k_3/k_1$ reduce the required column driving voltage further. Preferably the ratio $k_3/k_1$ is less than 1.25.

In accordance with the invention an LC layer is selected whose transmission vs. voltage characteristic curve falls steeply between 99% and 1% transmission, i.e. having a low required column voltage ($\Delta V_{appl}$), e.g. less than 25 Volts.

PALC display devices constructed in accordance with the invention will increase the fraction of the column voltage effective across the LC pixel elements. For a better understanding of the invention, its operating advantages and specific objects attained by its use, are illustrated and described in the accompanying drawings and descriptive matter, like reference numerals or letters signifying the same or similar components.

DESCRIPTION OF THE PREFERRED EMBODIMENTS

Figure 1:
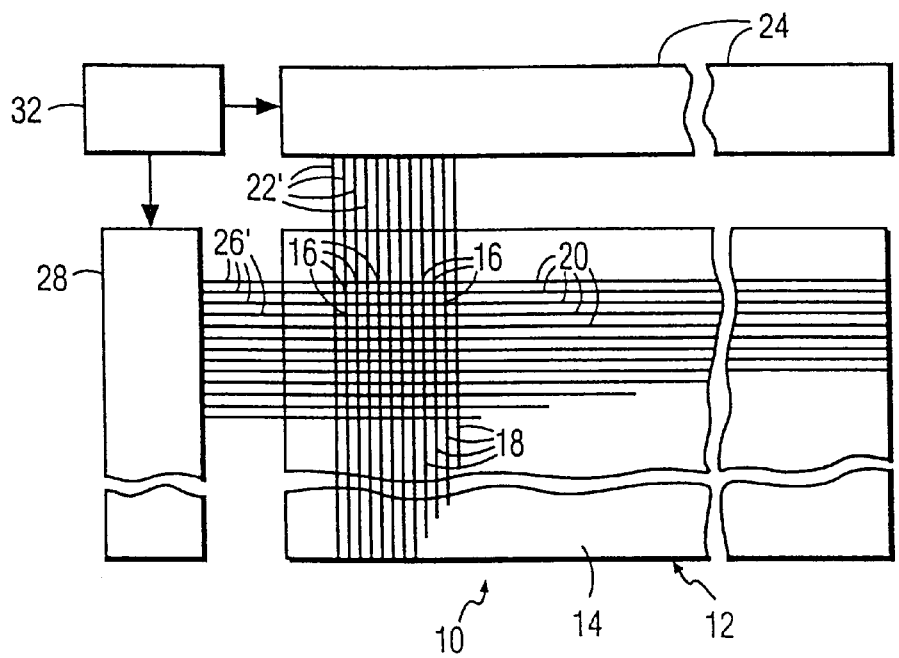
FIG. 1 is a schematic block diagram of a conventional flat panel display system.

FIG. 1 shows a flat panel display system 10, which represents a typical PALC display device and the operating electronic circuitry. With reference to FIG. 1, the flat panel display system comprises a display panel 12 having a display surface 14 that contains a pattern formed by a rectangular planar array of nominally identical data storage or display elements 16 mutually spaced apart by predetermined distances in the vertical and horizontal directions. Each display element 16 in the array represents the overlapping portions of thin, narrow electrodes 18 arranged in vertical columns and elongate, narrow channels 20 arranged in horizontal rows. (The electrodes 18 are hereinafter referred to from time to time as "column electrodes"). The display elements 16 in each of the rows of channels 20 represent one line of data.

The widths of column electrodes 18 and channels 20 determine the dimensions of display elements 16, which are typically of rectangular shape. Column electrodes 18 are deposited on a major surface of a first electrically nonconductive, optically transparent substrate 34, and the channel rows are usually built into a second transparent substrate 36. Skilled persons will appreciate that certain systems, such as reflective display of either the direct view or projection type, would require that only one substrate be optically transparent.

Column electrodes 18 receive data drive signals of the analog voltage type developed on parallel output conductors 22' by different ones of output amplifiers 23 (FIG. 2) of a data driver or drive circuit 24, and channels 20 receive data strobe signals of the voltage pulse type developed on parallel output conductors 26' by different ones of output amplifiers 21 (FIG. 2) of a data strobe or strobe means or strobe circuit 28. Each of the channels 20 includes a reference electrode 30 (FIG. 2) to which a reference potential, common to each channel 20 and data strobe 28 is applied. The reference potential is in general switched alternatively to $0.5(V_{99}+V_1)$ and $-0.5(V_{99}+V_1)$ (see FIG. 6 for $V_1$ and $V_{99}$).

To synthesize an image on the entire area of display surface 14, display system 10 employs a scan control circuit 32 that coordinates the functions of data driver 24 and data strobe 28 so that all columns of display elements 16 of display panel 12 are addressed row by row in row scan fashion. Display panel 12 may employ electro-optic materials of different types. For example, if it uses such material that changes the polarization state of incident light rays, display panel 12 is positioned between a pair of light polarizing filters, which cooperate with display panel 12 to change the luminance of light propagating through them. The use of a scattering liquid crystal cell as the electro-optic material would not require the use of polarizing filters, however. All such materials or layers of materials which attenuate transmitted or reflected light in response to the voltage across it are referred to herein as LC materials. A colour filter (not shown) may be positioned within display panel 12 to develop multi-coloured images of controllable colour intensity. For a projection display, colour can also be achieved by using three separate monochrome panels 12, each of which controls one primary colour.

Figure 2:
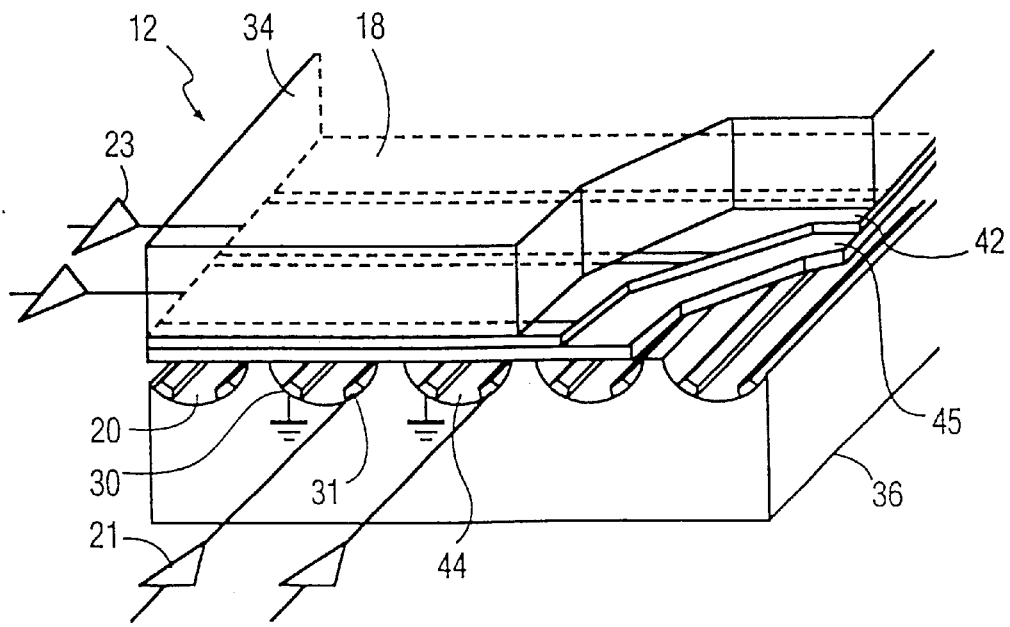
FIG. 2 is a perspective view of part of a conventional PALC display device.

FIG. 2 illustrates the PALC version of such a display panel using LC material. Only three of the column electrodes 18 are shown. The row electrodes 20 are constituted by a plurality of parallel elongated sealed channels underlying (in FIG. 2) a layer 42 of the LC material. Each of the channels 20 is filled with an ionizable gas 44, closed off with a thin dielectric sheet 45 typically of glass, and contains on an interior channel surface first and second spaced elongated electrodes 30, 31 which extend the full length of each channel. The first electrode 30 is grounded and is commonly called the cathode. The second electrode 31 is called the anode, because to it will be supplied relative to the cathode electrode a positive strobe pulse sufficient to cause electrons to be emitted from the cathode 30 to ionize the gas. As explained above, each channel 20, in turn, has its gas ionized with a strobe pulse to form a plasma and a grounded line connection to a row of pixels in the LC layer 42 above. When the strobe pulse terminates, and after deionization has occurred, the next channel is strobed and turned on. Since the column electrodes 18 each cross a whole column of pixels, only one plasma row connection at a time is allowed on to avoid crosstalk.

Figure 3:
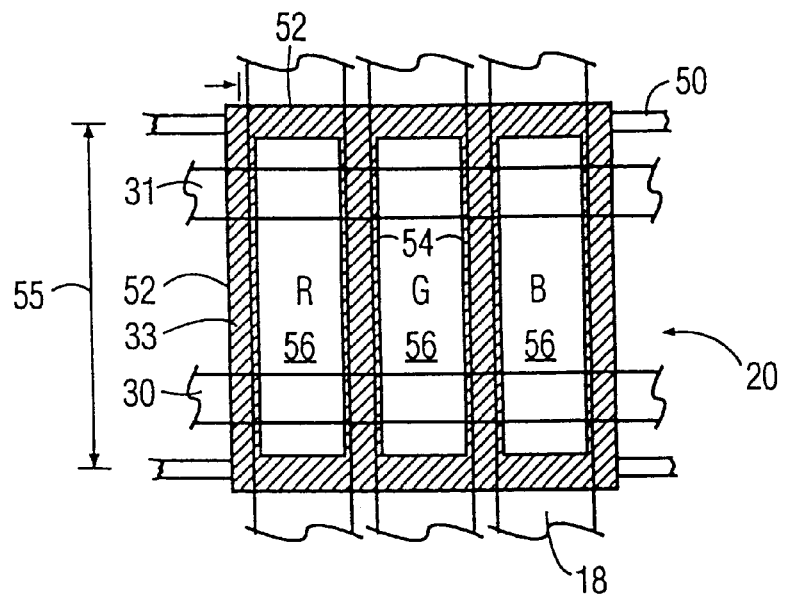
FIG. 3 is a view from the top of a single pixel of a PALC colour display device.

FIG. 3 is a view from the top showing the layout of a pixel when a typical colour filter is present. The view in FIG. 3 is rotated 90° so that the column electrodes 18 now extend vertically in the drawing, and the channel 20 extends horizontally from left to right. Reference numerals 50 designate the substrate ridges flanking each hemicylindrical channel. Black masking 52 surrounds each pixel, and black masking 54 divides each pixel into three sections each underlying a striped segment 56 of a colour filter corresponding to the typical red, green and blue colours. The masking restricts visibility of a viewer, usually positioned on the column electrode side, to each LC pixel via its colour filter section 56 as back-lighted from a light source behind the plasma channel side. The transparency of the LC pixel is determined by the stored data voltage in its inherent capacitance. The aperture is the ratio of the transparent area of the pixel to its total area, which is typically about 40%. A typical pixel size 55 is about 0.5 mm representing the spacing between the channel ridges 50 and the length of the perpendicular block surround side 52.

Fabrication of an PALC device is typically done by providing first and second substrates 34, 36 with the first substrate 34 comprising a glass panel on which is vapour-deposited the ITO column electrodes 18, followed by colour filter processing above the ITO electrodes to produce the RGB stripes 56, followed by the black surround processing and liquid crystal alignment processing. The second substrate 36, also a glass panel, is masked and etched to form the channels 20, following which the plasma electrode material is deposited and masked and etched to form the cathode 30 and anode 31 electrodes. A thin dielectric glass microsheet 45 is then sealed across the channel ridges 50 to seal off the channels 20, which are then exhausted, back-filled with a low-pressure ionizable gas such as helium, and sealed off. The LC alignment layer is then deposited onto the exposed surface of the microsheet 45. The two assembled substrates are then assembled into a panel with the two LC alignment surfaces spaced apart and facing, the LC material 42 introduced into the space, and electrical connections made to the column electrodes 18 and plasma electrodes 30, 31.

Figure 4:
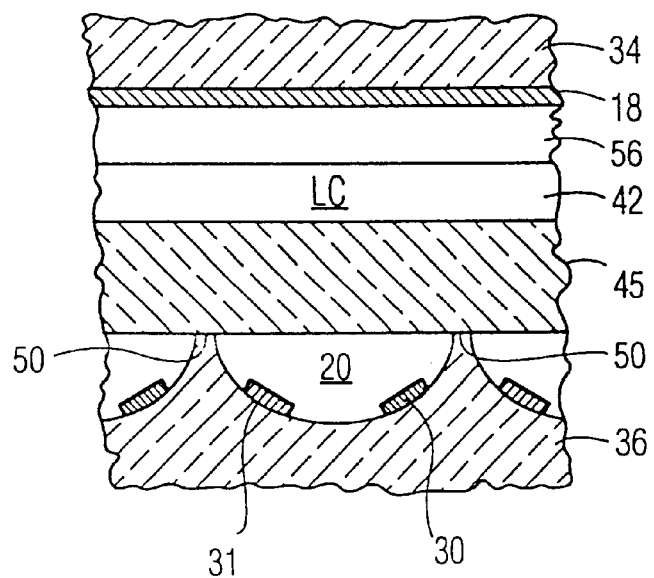
FIG. 4 is a cross-section of a channel of a prior art PALC display device to illustrate the performance of such a device.

FIG. 4 is a schematic, simplified view of a cross-section through a single pixel with a colour filter 56 present. The current PALC colour panels use a 50 µm thin sheet 45 of glass having a dielectric constant of about 6, colour filters 56 typically of gelatine, polyimides, and organic acrylic based materials having a thickness of about 2–3 µm but usually with a planarizing topcoat resulting in an overall thickness of about 5 µm and a typical dielectric constant of about 3, and a typical LC material like ZLI4277 from E. Merck of Darmstadt, Frankfurt, Germany, of a thickness of about 4 µm and a typical mean dielectric constant of about 5.1. Assuming now that a plasma has been fired in the channel 20 so that the channel is effectively at a reference such as ground potential, and a column voltage Vito is then applied to the ITO column 18, it turns out that the effective voltage across the LC pixel region between the electrode 18 and the plasma channel 20, which voltage is responsible for determining the extent of the LC's attenuation for light, is only about 0.074 Vito. Hence, when, say, 100 V is used as the driving voltage, only about 7V is effective across the LC pixel region.

A feature of our invention is based upon the realization that at the frequencies of the data voltages commonly applied to the ITO data electrodes, the voltage division between the ITO electrode and the plasma channel is of a capacitive nature. Based upon this understanding, we have found that the fraction of the data voltage actually applied directly across the LC pixel and controlling its attenuation can be increased.

Figure 5:
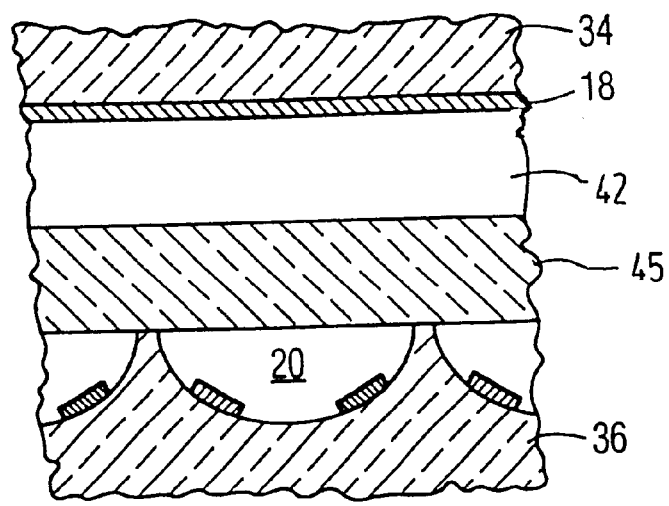
FIG. 5 is a cross-section of a channel of a PALC display device in accordance with the invention.

FIG. 5 illustrates one form of PALC device without a colour filter.

Figure 6:
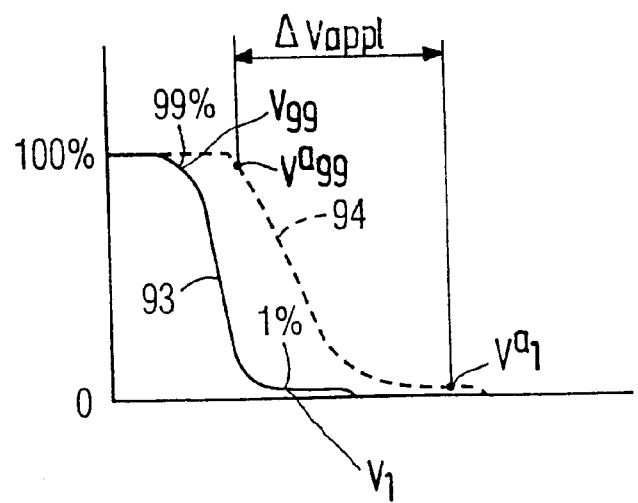
FIG. 6 is the characteristic curve of transmission vs. voltage for LC materials.

FIG. 6 shows the typical characteristic curve of transmission vs. voltage for LC materials (curve 93). The significant points, as indicated in FIG. 6, are the voltage at which the transmission falls to 99% and the voltage at which the transmission falls to 1%. The total range of greylevels can be adressed with a maximum peak to peak voltage of $V_1$–$V_{99}$ over the LC (liquid crystal layer). Curve 94 in FIG. 6 shows the voltage between the column electrodes corresponding to voltage 93 over the liquid crystal layer. The smaller the dynamic range ($\Delta V_{appl}$) the smaller the required column voltages are, the steeper the curve is. The total range of greylevels can be adressed with a maximum peak to peak voltage of $\Delta V_{appl}$ over the column electrodes. The dynamic range is $\Delta V_{appl} = V^a1 - V^a99$. The steepness of curve 94 determine $\Delta V_{appl}$.

In the FIGS. 7 to 11 $\Delta V_{appl}$ is given as a function of several parameters. Indicated in the figures are, except when indicated otherwise the values for $\Delta V_{appl}$ in Volts on the vertical axis. The values for $\epsilon \perp$, the dielectric constant perpendicular to the director, $\Delta \epsilon$, the dielectric anisotropy, d, the thickness (in µm) of the LC layer, $\Delta n$, the optical anisotropy (birefringence) of the LC material, $\Phi$ or phi, the twist angle of the LC layer (in degrees), $k_3/k_1$, the ratio of the elastical constants $k_3$ and $k_1$ of the material of the LC layer, and and d/p, the ratio of the thickness of the LC material and the pitch of the material of the LC layer are indicated in the figures.

Figure 7:
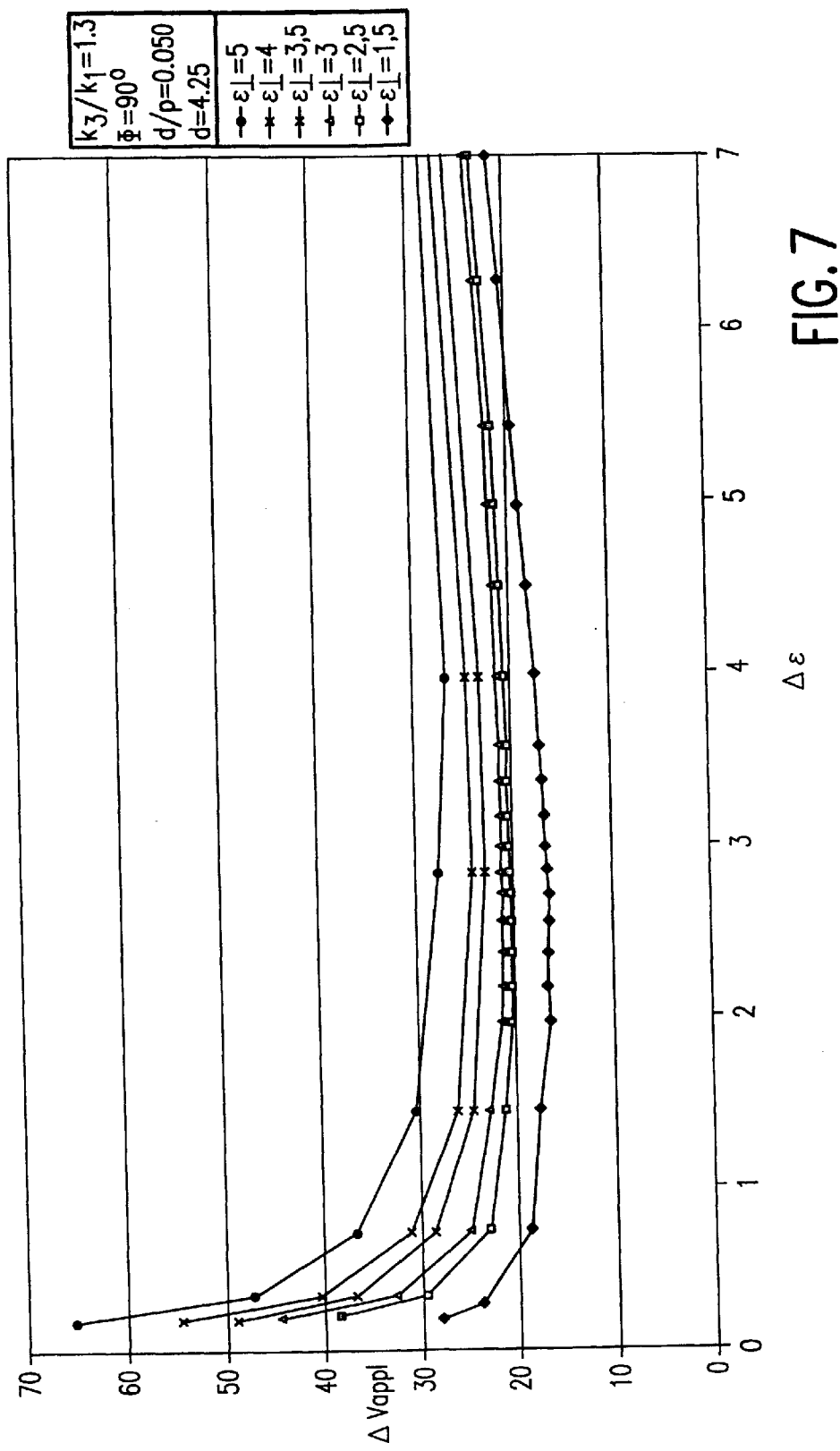
FIG. 7 shows in a graphical form $\Delta V_{appl}$ as a function of $\epsilon\perp$ and $\Delta\epsilon$.
Figure 8:
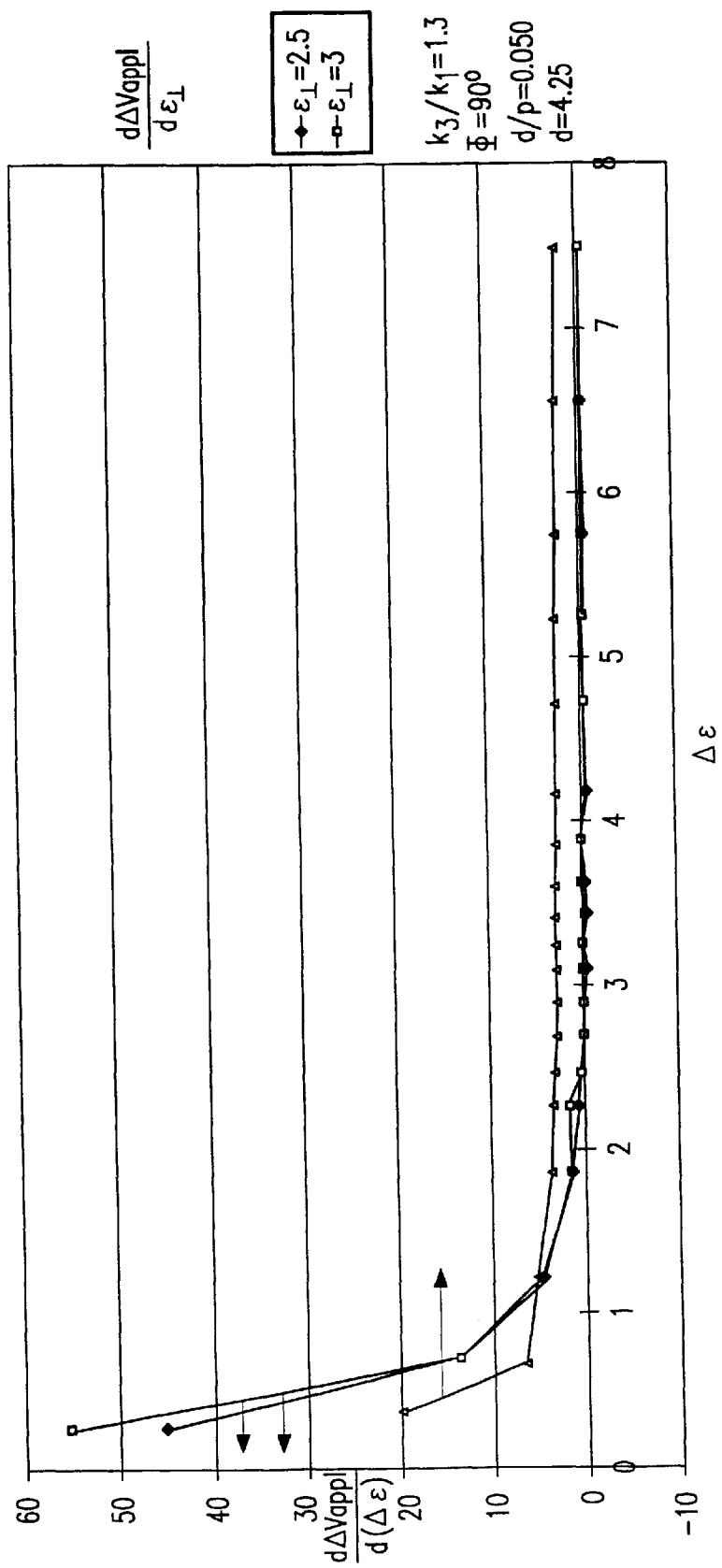
FIG. 8 graphically shows the dependence of $\Delta V_{appl}$ on $\epsilon\perp$ and $\Delta\epsilon$.

FIG. 7 graphically shows the value of $\Delta V_{appl}$ as a function of the parameters $\Delta \epsilon$ and $\epsilon_\perp$. The value for $\epsilon_\perp$ ranges between 1.5 and 5, the value for $\Delta \epsilon$ ranges between 0 and 9. The curves all show a similar shape with a minimum. The invention is based on the insight that an LC material is used which has an $\Delta \epsilon$ and $\epsilon_\perp$ such that $\Delta V_{appl}$ is small (near or at the minima of the curves). To this end the LC material has a value for $\Delta \epsilon$ and $\epsilon$ within the indicated ranges ($1.5 \leq \epsilon \perp \leq 5$, $1 \leq \Delta \epsilon \leq 9$). For such values of $\Sigma \perp$ and $\Delta \Sigma$ $1 \Delta V_{appl}$ has a low value and $\Delta V_{appl}$ is also hardly or not all dependent on changes in $\Delta \epsilon$ and $\epsilon_\perp$, as is shown in FIG. 8, which shows (on the vertical axis) the change in $\Delta V_{appl}$ for a change of 1 in $\Delta \epsilon$ or in $\epsilon_\perp$. For simplicity FIG. 7 shows only a limited number of curves. FIG. 8 shows that the derivative of $\Delta V_{appl}$ with respect to $\Delta \epsilon$ or with respect to $\epsilon_\perp$ increases sharply for values of $\Delta \epsilon$ less than 1. This means that for such small values of $\Delta \epsilon$ even a small change in $\Delta \epsilon$ may cause a considerable change in $\Delta V_{appl}$. For instance at $\Delta \epsilon = 0.3$ a change in $\Delta \epsilon$ of 0.1 causes a change in $\Delta V_{appl}$ of 5–6 Volts, which may have a noticeable negative influence on the operation of the PALC device. The dielectric constants can be and in general are to some extent are dependent on temperature. Therefor temperature, or other effects influencing the dielectric constants may have detrimental effects on the operation of the device. Within the ranges of the present invention ($1 \leq \Delta \epsilon \leq 9$) this negative effect is strongly reduced as is shown in FIG. 8. For the range $2 \leq \Delta \epsilon \leq 5$ the dependence is reduced even stronger. The minima of the curves shown in FIG. 7 lie at approximately $\Delta \epsilon / \epsilon_\perp = 1$ ($0.5 \leq \Delta \epsilon / \epsilon_\perp \leq 2$).

Figure 9:
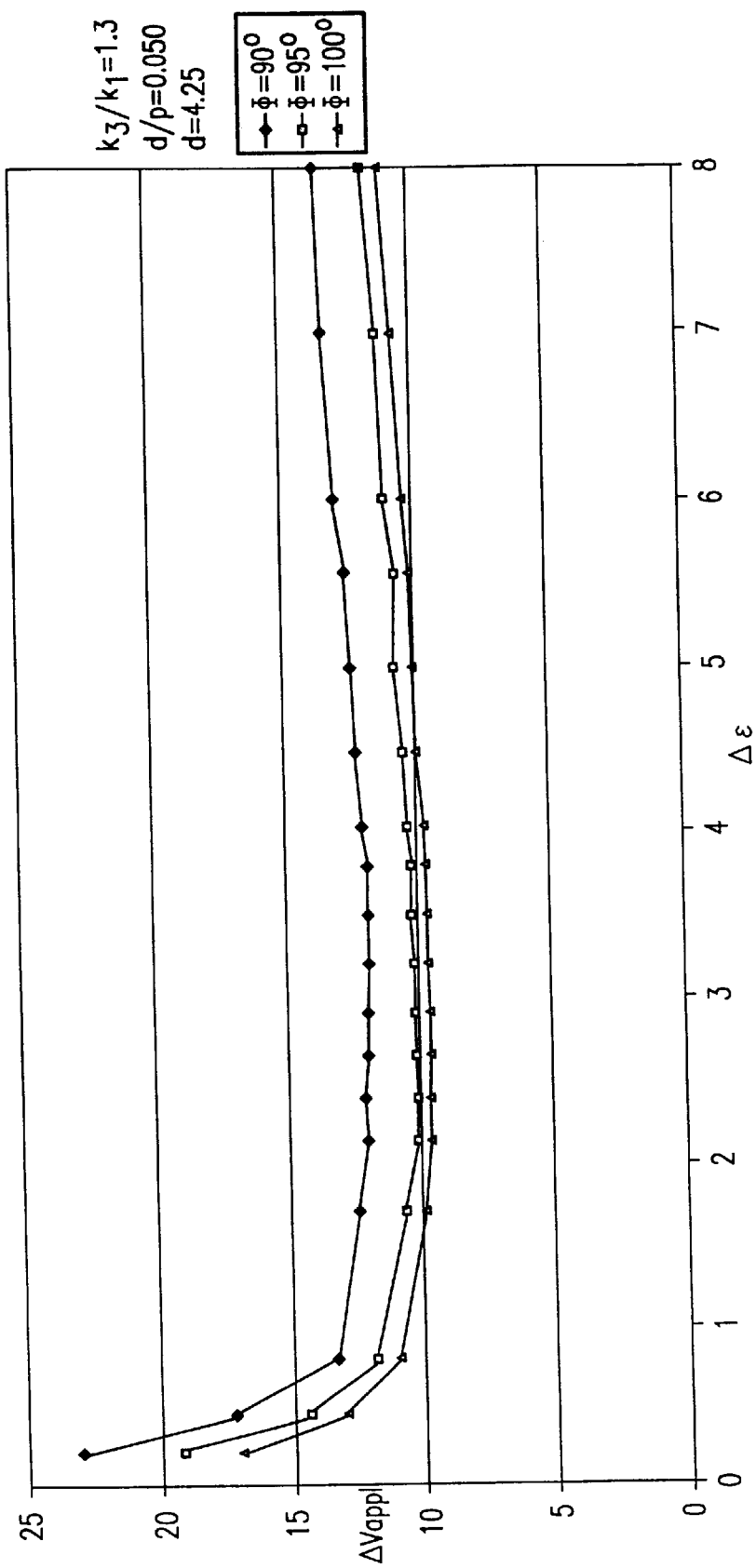
FIGS. 9 and 10 graphically show the dependence of $\Delta V_{appl}$ on the twist angle $\Phi$.

FIG. 9 shows the value of $\Delta V_{appl}$ to be dependent on the twist angle $\phi$. What is shown is that, when all other parameters are left unchanged, an increase of the twist angle $\Phi$ reduces the dynamic range $\Delta V_{appl}$.

Figure 10:
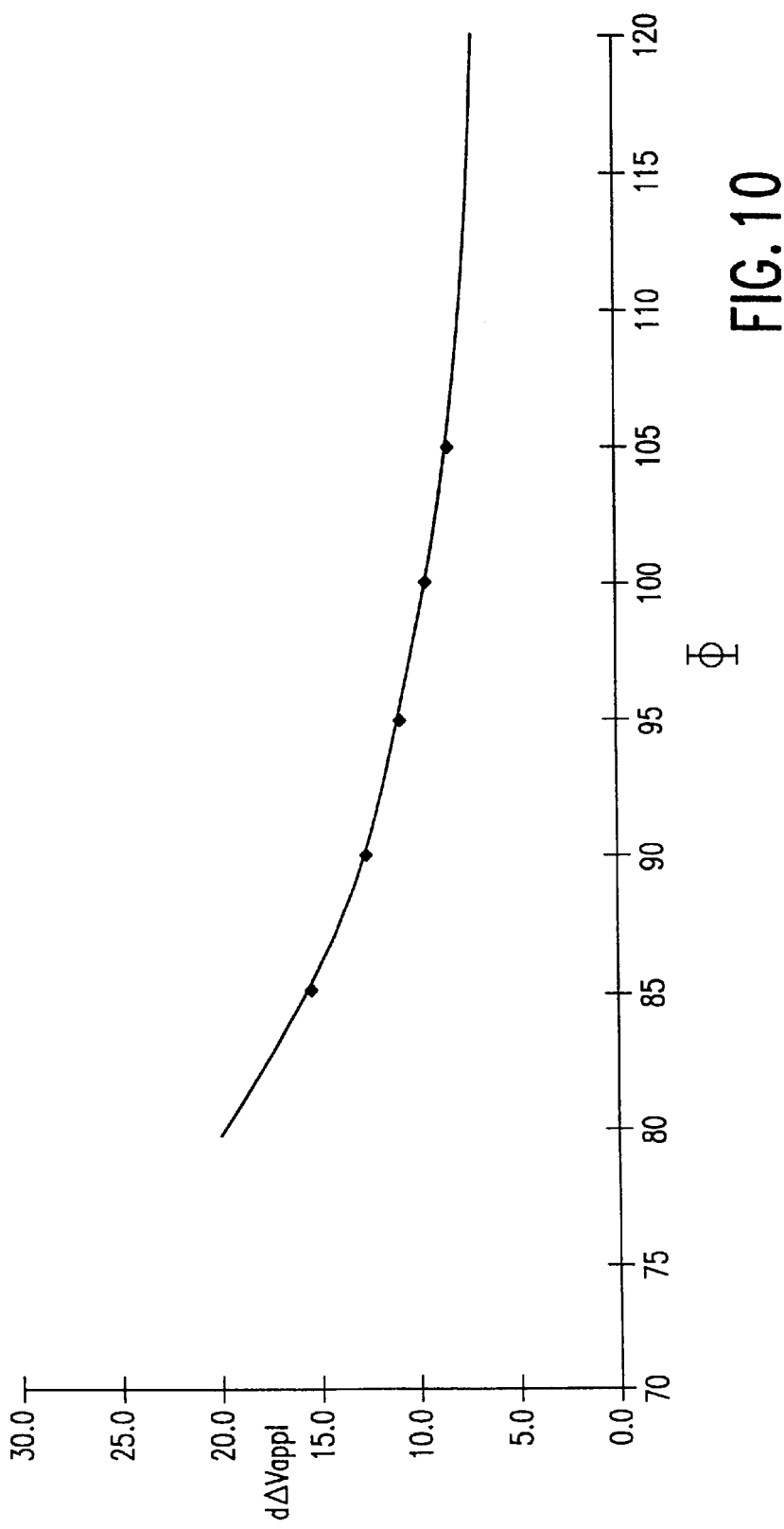

FIG. 10 graphically shows the minimum of the curves for different twist angles. Preferably the twist angle lies between 80 and 110 degrees, for angles smaller than 80 degrees the dynamic range becomes relatively large, for angles larger than 120 degrees the viewing angle (i.e. the angle under which the image can be seen) becomes relatively small. Preferably the twist angle is between 85 and 110 degrees, with a most preferred range of 90–100 degrees. Within the indicated ranges, an increasingly better compromise between viewing angle and dynamic range can be made. Altoghough the advantageous reduction of the dynamic range for higher twist angles is in particular of importance for PALC devices having LC material with values for $\Delta \epsilon$ and $\epsilon_\perp$ within the indicated range(s), the relation between the twist angle and the dynamic range, and the above mentioned advantages also hold for materials having values for for $\Delta \epsilon$ and $\epsilon_\perp$ outside the indicated ranges.

Figure 11:
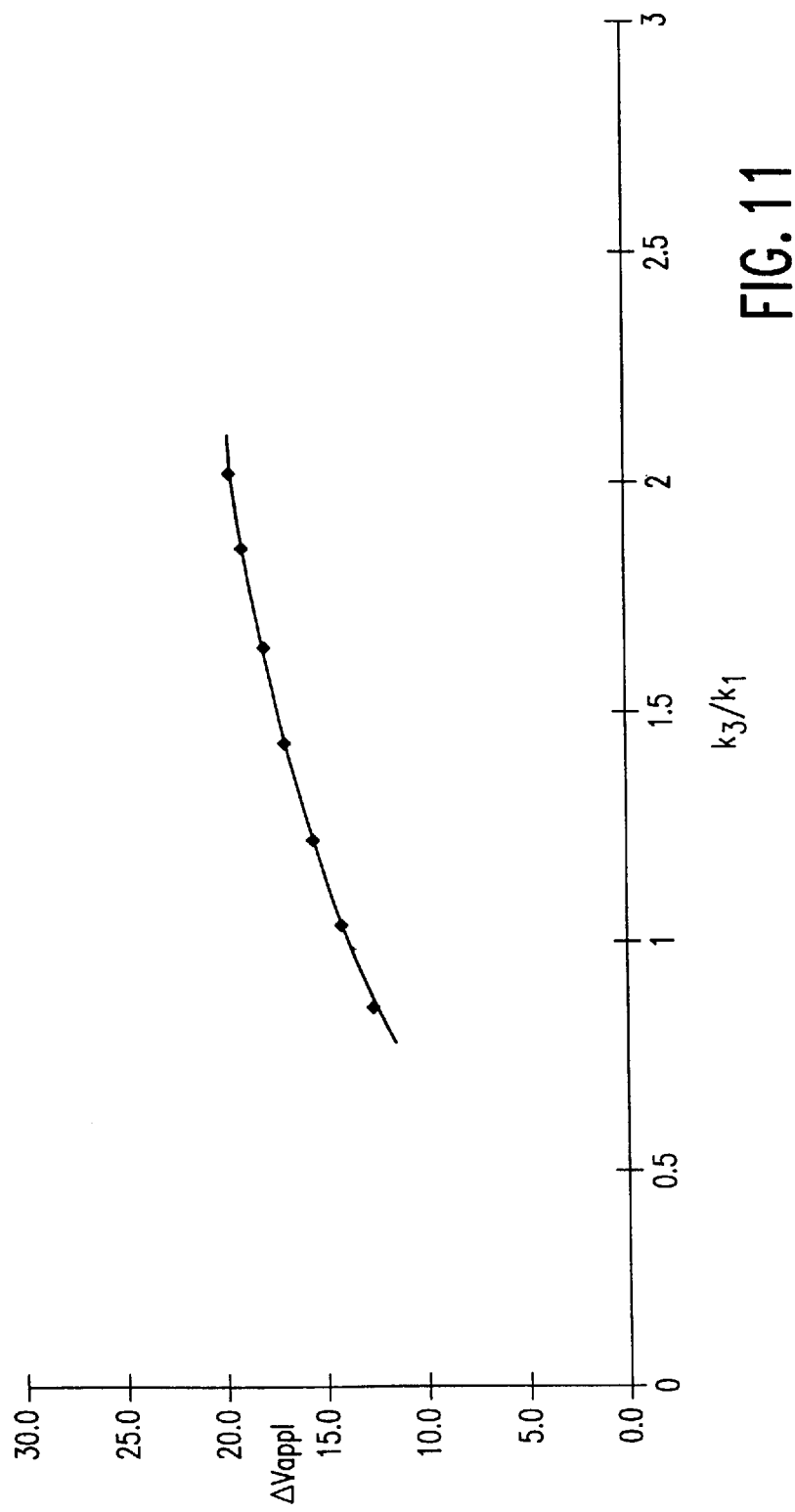
FIG. 11 graphically shows the dependence of $\Delta V_{appl}$ on the ratio $k_3/k_1$.

FIG. 11 graphically shows that the dynamic range is dependent on the ratio $k_3/k_1$ (the value for $\Delta \epsilon$ is 3.0, the value for $\epsilon_\perp$ is 3.0, the twist angle is 90 degrees, d=6.07 µm, d/p=0.025). Going from $k_3/k_1 = 2$ to 0.8 the dynamic range is reduced by approximately 40%. Preferably the ratio $k_3/k_1$ is less than 1.5. Ratio's smaller than 1.3 are in particular preferred. This range for $k_3/k_1$ is, it is remarked, also preferred for values for $\Delta \epsilon$ and $\epsilon_\perp$ outside the above indicated ranges.

The dynamic range $\Delta V_{appel}$ is also dependent on the value for d/p. The smaller the value for d/p is (d is the thickness of the LC layer, p is the pitch of the material of the LC layer), the smaller the dynamic range is. A change from d/p=0.05 to d/p=0.025 reduces the dynamic range by approximately 7%. Preferably the d/p is small, lower than 0.25, and even more preferred smaller than 0.05. Tables 1 and 2 disclose some values for the dynamic range for a number of values for the above given parameters. The best values for the parameter d$\Delta n$ range between 0.4 and 0.6 µm, preferably between 0.45 and 0.5 µm, $\Delta n$ ranges preferably between 0.06 and 0.1.

TABLE 1

| Δε | ε⊥=2.5, d=4.25, d/p=0.050, k3/k1=1.3, Φ=90° | ε⊥=3.0, d=4.25, d/p=0.050, k3/k1=1.3, Φ=90° | ε⊥=3.5, d=4.25, d/p=0.050, k3/k1=1.3, Φ=90° | ε⊥=4.0, d=4.25, d/p=0.050, k3/k1=1.3, Φ=90° | ε⊥=2.5, d=6.07, d/p=0.050, k3/k1=1.3, Φ=90° | ε⊥=3.0, d=6.07, d/p=0.050, k3/k1=1.3, Φ=90° | ε⊥=2.5, d=4.25, d/p=0.025, k3/k1=1.3, Φ=90° | ε⊥=3.0, d=4.25, d/p=0.025, k3/k1=1.3, Φ=90° | ε⊥=2.5, d=4.25, d/p=0.025, k3/k1=1.8, Φ=90° | ε⊥=3.0, d=4.25, d/p=0.025, k3/k1=1.8, Φ=90° | ε⊥=2.5, d=6.07, d/p=0.025, k3/k1=1.8, Φ=90° | ε⊥=3.0, d=6.07, d/p=0.025, k3/k1=1.8, Φ=90° | ε⊥=2.5, d=6.07, d/p=0.025, k3/k1=1.8, Φ=95° | ε⊥=3.0, d=6.07, d/p=0.025, k3/k1=1.8, Φ=95° | ε⊥=2.5, d=4.25, d/p=0.025, k3/k1=1.8, Φ=95° |
|---|---|---|---|---|---|---|---|---|---|---|---|---|---|---|---|
| 8.0 | 22.8 | 23.7 | 24.6 | 26.1 | 16.7 | 17.3 | 21.7 | 22.4 | 18.1 | 18.8 | 13.2 | 13.6 | 11.5 | 11.9 | 15.7 |
| 7.0 | 22.2 | 23.1 | 24.1 | 25.0 | 16.3 | 17 | 21 | 21.9 | 17.6 | 18.3 | 13 | 13.3 | 11.2 | 11.6 | 15.3 |
| 6.0 | 21.6 | 22.6 | 23.6 | 24.6 | 15.9 | 16.6 | 20.4 | 21.3 | 17.1 | 17.8 | 12.5 | 13 | 10.9 | 11.3 | 14.8 |
| 5.5 | 21.3 | 22.4 | | | 15.7 | 16.4 | 20.1 | 21 | 16.8 | 17.5 | 12.3 | 12.8 | 10.7 | 11.1 | 14.6 |
| 5.0 | 21 | 22.1 | 23.2 | 24.3 | 15.5 | 16.3 | | | 16.5 | 17.3 | 12.2 | 12.7 | 10.6 | 11 | 14.5 |
| 4.5 | 20.8 | 21.9 | | | 15.4 | 16.1 | 19.5 | 20.5 | 16.3 | 17.1 | 12 | 12.5 | 10.4 | 10.9 | 14.1 |
| 4.0 | 20.5 | 21.7 | 22.9 | 24.1 | 15.2 | 16.1 | 19.3. | 20.3 | 16.1 | 16.9 | 11.9 | 12.5 | 10.3 | 10.8 | 13.9 |
| 3.8 | 20.5 | 21.7 | | | 15.2 | 16.1 | 19.1 | 20.3 | 16 | 16.8 | 11.8 | 12.5 | 10.3 | 10.8 | 13.8 |
| 3.6 | 20.4 | 21.6 | | | 15.2 | 16 | 19.1 | 20.2 | 15.9 | 16.8 | 11.8 | 12.4 | 10.2 | 10.8 | 13.8 |
| 3.4 | 20.3 | 21.6 | | | 15.1 | 16 | 19 | 19.4 | 15.8 | 16.7 | 11.8 | 12.4 | 10.2 | 10.7 | 13.7 |
| 3.2 | 20.3 | 21.6 | 22.9 | 24.2 | 15.1 | 16 | 19 | 20.2 | 15.7 | 16.7 | 11.7 | 12.4 | 10.2 | 10.7 | 13.6 |

TABLE 2

| Δε | ε⊥=2.5, d=4.25, d/p=0.050, k3/k1=1.3, Φ=90° | ε⊥=3.0, d=4.25, d/p=0.050, k3/k1=1.3, Φ=90° | ε⊥=3.5, d=4.25, d/p=0.050, k3/k1=1.3, Φ=90° | ε⊥=4.0, d=4.25, d/p=0.050, k3/k1=1.3, Φ=90° | ε⊥=2.5, d=6.07, d/p=0.050, k3/k1=1.3, Φ=90° | ε⊥=3.0, d=6.07, d/p=0.050, k3/k1=1.3, Φ=90° | ε⊥=2.5, d=4.25, d/p=0.025, k3/k1=1.3, Φ=90° | ε⊥=3.0, d=4.25, d/p=0.025, k3/k1=1.3, Φ=90° | ε⊥=2.5, d=4.25, d/p=0.025, k3/k1=1.8, Φ=90° | ε⊥=3.0, d=4.25, d/p=0.025, k3/k1=1.8, Φ=90° | ε⊥=2.5, d=6.07, d/p=0.025, k3/k1=1.8, Φ=90° | ε⊥=3.0, d=6.07, d/p=0.025, k3/k1=1.8, Φ=90° | ε⊥=2.5, d=6.07, d/p=0.025, k3/k1=1.8, Φ=95° | ε⊥=3.0, d=6.07, d/p=0.025, k3/k1=1.8, Φ=95° | ε⊥=2.5, d=4.25, d/p=0.025, k3/k1=1.8, Φ=95° |
|---|---|---|---|---|---|---|---|---|---|---|---|---|---|---|---|
| 3.0 | 20.2 | 21.6 | | | 15.1 | 16.1 | 18.9 | 20.2 | 15.7 | 16.7 | 11.7 | 12.4 | 10.1 | 10.7 | 13.6 |
| 2.8 | 20.2 | 21.6 | | | 15.1 | 16.1 | 18.9 | 20.2 | 15.6 | 16.7 | 11.7 | 12.4 | 10.1 | 10.7 | 13.5 |
| 2.6 | 20.2 | 21.6 | 23.1 | 24.5 | 15.1 | 16.1 | 18.9 | 20.3 | 15.6 | 16.7 | 11.7 | 12.4 | 10.1 | 10.7 | 13.5 |
| 2.4 | 20.3 | 21.7 | | | 15.2 | 16.2 | 18.9 | 20.4 | 15.7 | 16.8 | 11.8 | 12.5 | 10.1 | 10.8 | 13.5 |
| 2.2 | 20.3 | 21.9 | | | 15.3 | 16.3 | 18.9 | 20.4 | 15.7 | 16.9 | 11.8 | 12.6 | 10.2 | 10.8 | 13.5 |
| 1.6 | 20.9 | 22.7 | 24.5 | 26.3 | 15.8 | 178.1 | 19.5 | 21.2 | 16 | 17.4 | 12.2 | 13.1 | 10.4 | 11.2 | 13.8 |
| 0.8 | 20.8 | 26.3 | 28.9 | 31.5 | 18.3 | 20.1 | 22.3 | 24.7 | 18.2 | 20.1 | 13.5 | 15.3 | 12 | 12.9 | 15.4 |
| 0.4 | 29.5 | 33.1 | 36.8 | 40.4 | 22.9 | 25.5 | 27.6 | 31.1 | 22.5 | 25.2 | 17.4 | 19.4 | 14.6 | 16.2 | 18.9 |
| 0.2 | 38.8 | 44.2 | 49.1 | 54.3 | 30.2 | 33.9 | 36.3 | 41.1 | 29.4 | 33.3 | 23 | 25.7 | 19.2 | 21.4 | 24.6 |

For calculating the values of $\Delta V_{appl}$ the thickness of sheet 45 (see FIG. 5) is chosen to be 30 μm, the pretilt angle is chosen to be 3°.

A number of liquid crystal materials having values for Δε, ε⊥, $k_3/k_1$ within the indicated ranges, or at least some of the indicted ranges, is given below. The numbers stand for materials manufactured by the firm Merck et al. By a combination of these materials with each other or with other materials a wide range of values is possible.

| material | Δε | ε⊥ | $k_3/k_1$ | Δn |
|---|---|---|---|---|
| 3276-100 | 4.6 | 3.7 | 1.27 | 0.0986 |
| 3279 | 5.4 | 4.2 | 1.16 | 0.0837 |
| 3021-000 | 4.6 | 3.9 | 1.4 | 0.0872 |
| 3021-100 | 3.1 | 3.6 | 1.33 | 0.0845 |
| 3054-000 | 4.6 | 3.6 | 1.43 | 0.0991 |
| 3054-100 | 3.0 | 2.6 | 1.29 | 0.0970 |
| 3103 | 2.4 | 3.5 | 1.28 | 0.0735 |
| 3561-100 | 2.6 | 3.4 | 1.02 | 0.0830 |
| 3560-100 | 2.6 | 3.4 | 1.16 | 0.0835 |
| 3771 | 3.7 | 3.6 | 1.22 | 0.1045 |
| 3125 | 2.4 | 3.6 | 1.21 | 0.0516 |
| 4119 | 3.0 | 4.1 | 1.28 | 0.0630 |

The invention can be used in all kinds of PALC displays that typically have a small channel pitch for use in computer monitors, workstations or TV applications.

While the invention has been described in connection with preferred embodiments, it will be understood that modifications thereof within the principles outlined above will be evident to those skilled in the art and thus the invention is not limited to the preferred embodiments but is intended to encompass such modifications.

Phrased in other words the invention relates to a plasma-addressed liquid crystal colour display device comprising a layer of liquid crystal material, data electrodes coupled to the liquid crystal layer and adapted to receive data voltages for activating pixels of the liquid crystal layer, and a plurality of ionizable-gas-filled plasma channels extending generally transverse to the data electrodes for selectively switching on said liquid crystal pixels. The plasma channels are sealed off by a thin dielectric sheet, and a colour filter layer is provided in the device through which changes in the attenuation of the liquid crystal pixels may be viewed to obtain a colour image. To reduce the magnitude of the data voltages needed to activate the device, the LC layer is given properties such that a much higher fraction of the applied data voltages appears across the liquid crystal layer thereby allowing a smaller data voltage to be used to obtain the same effect on the liquid crystal pixels.

The reduction of the dynamic range is obtained by the increase in steppness of the transmission-voltage curve 94 (see FIG. 6). In the examples a TN (Twisted-Nematic) PALC devise is shown. The invention is not restricted to the above examples. For instance the invention can be advantageously used in liquid crystal device of the PALC-type wherein the supertwisted nematic effect (using an LCD layer with a twist angle in the range 180°–360°, preferable between 240° and 300°) or the twisted vertically aligned nematic effect (see K. A. Crandall et al, Appln. Phys. Lett. 65, 118 (1994)) is used.

What is claimed is:

1. A plasma-addressed liquid crystal display device comprising a layer of liquid crystal material, data electrodes coupled to the liquid crystal layer and adapted to receive data voltages for activating portions of the liquid crystal layer, a plurality of elongated plasma channels extending generally transverse to the data electrodes for selectively switching on said liquid crystal portions, a dielectric sheet closing off the plasma channels on the side facing the data electrodes, said plasma channels each comprising spaced elongated cathode and anode plasma electrodes and an ionizable gas filling, the liquid crystal layer being located between the data electrodes and the plasma channels, and having a twist angle between 80 and 120 degrees, and the dielectric anisotropy ($\Delta\epsilon$) lying between 1 and 9 and the dielectric constant perpendicular to the director ($\epsilon\perp$) lying between 1.5 and 5, respectively ($1.5 \leq \epsilon\perp \leq 5$; $1 \leq \Delta\epsilon \leq 9$).

2. A plasma-addressed liquid crystal display device as claimed in claim 1, characterized in that the dielectric constant perpendicular to the director $\epsilon_\perp$ lies between 1.5 and 3.5.

3. A plasma-addressed liquid crystal display device as claimed in claim 1, characterized in that the dielectric anisotropy ($\Delta\epsilon$) lies between 2 and 5 ($2 \leq \Delta\epsilon \leq 5$).

4. A liquid crystal display device as claimed in claim 1, characterized in that the liquid crystal material has a value for $k_3/k_1$, the ratio of the elastic constants $k_3$ and $k_1$ of the liquid crystal material between 0.8 and 1.5.

5. A liquid crystal display device as claimed in claim 4 wherein $k_3/k_1$ is between 0.8 and 1.3.

6. A liquid crystal display device as claimed in claim 1, having a value for d/p smaller than 0.25, where d is the thickness of the LC layer and p is the pitch of the material of the LC layer.

7. A liquid crystal display device as claimed in claim 6 wherein d/p is less than 0.05.

* * * * *